(12) United States Patent
Kalmstrom et al.

(10) Patent No.: US 8,635,362 B2
(45) Date of Patent: Jan. 21, 2014

(54) COMMUNICATION SYSTEM AND METHOD

(75) Inventors: Peter Anders Kalmstrom, Norrköping (SE); Nick Corr, London (GB); Simon Michael Hade, London (GB)

(73) Assignee: Skype, Dublin (IE)

( * ) Notice: Subject to any disclaimer, the term of this patent is extended or adjusted under 35 U.S.C. 154(b) by 114 days.

(21) Appl. No.: 12/584,987

(22) Filed: Sep. 15, 2009

(65) Prior Publication Data

US 2010/0287301 A1   Nov. 11, 2010

(30) Foreign Application Priority Data

May 7, 2009   (GB) .................................. 0907922.9

(51) Int. Cl.
*G06F 15/16*   (2006.01)

(52) U.S. Cl.
USPC ........................................................ 709/233

(58) Field of Classification Search
USPC ........... 709/217, 227, 233; 715/860; 370/352; 455/466; 379/88.17
See application file for complete search history.

(56) References Cited

U.S. PATENT DOCUMENTS

| | | | |
|---|---|---|---|
| 5,077,804 A | 12/1991 | Richard | |
| 5,455,858 A | 10/1995 | Lin | |
| 5,917,904 A * | 6/1999 | Theis | 379/355.08 |
| 6,169,791 B1 * | 1/2001 | Pokress | 379/114.02 |
| 6,453,024 B1 * | 9/2002 | Baker et al. | 379/93.29 |
| 6,477,247 B1 * | 11/2002 | Burg et al. | 379/354 |
| 6,928,150 B2 * | 8/2005 | Johnston | 379/114.01 |
| 7,028,027 B1 | 4/2006 | Zha et al. | |
| 7,162,025 B2 * | 1/2007 | Schnurr | 379/355.07 |
| 7,212,626 B1 | 5/2007 | Kobayashi | |
| 7,317,919 B1 * | 1/2008 | Ruf | 455/446 |
| 7,747,265 B1 * | 6/2010 | Ruf | 455/466 |
| 8,090,092 B2 | 1/2012 | Madanes et al. | |

(Continued)

FOREIGN PATENT DOCUMENTS

| | | |
|---|---|---|
| WO | WO 2005/008524 | 1/2005 |
| WO | WO 2005/009019 | 1/2005 |
| WO | WO-2010127992 | 11/2010 |

OTHER PUBLICATIONS

Notification of Transmittal of the International Search Report and Written Opinion of the International Searching Authority, or the Declaration, PCT/EP2010/055832, mailing date Jul. 26, 2010, 11 pages.

(Continued)

*Primary Examiner* — Sargon Nano
(74) *Attorney, Agent, or Firm* — Wolfe-SBMC

(57) ABSTRACT

A method, system and program for use in a communication system. The method comprises: interacting with a document-browser application executed on a first user terminal, the document-browser being configured to retrieve an electronic document from a first storage unit and display it on a screen, wherein the interaction comprises identifying a sequence of numeric or alphanumeric characters in the displayed document as being for use in initiating communication with a second user terminal over the communication system. The method further comprises: querying a second storage unit; and based on that query, selecting a display configuration for the identified sequence of characters from a plurality of available display configurations. The interaction further comprises modifying the display of a portion of the document so as to display the identified sequence of characters or information associated therewith in dependence on the determined display configuration.

27 Claims, 7 Drawing Sheets

(56) References Cited

U.S. PATENT DOCUMENTS

| | | | |
|---|---|---|---|
| 2002/0129359 A1* | 9/2002 | Lichner | 725/5 |
| 2003/0112932 A1* | 6/2003 | Johnston | 379/114.01 |
| 2004/0128144 A1 | 7/2004 | Johnson et al. | |
| 2004/0214558 A1* | 10/2004 | Chang et al. | 455/416 |
| 2004/0243939 A1* | 12/2004 | Perepa et al. | 715/739 |
| 2004/0266490 A1* | 12/2004 | Silver | 455/567 |
| 2005/0091274 A1 | 4/2005 | Stanford | |
| 2005/0097189 A1* | 5/2005 | Kashi | 709/217 |
| 2006/0224467 A1* | 10/2006 | Walker et al. | 705/26 |
| 2006/0248456 A1 | 11/2006 | Bender et al. | |
| 2006/0271457 A1* | 11/2006 | Romain et al. | 705/35 |
| 2007/0005439 A1* | 1/2007 | Sidlo et al. | 705/26 |
| 2007/0274510 A1* | 11/2007 | Kalmstrom | 379/350 |
| 2007/0274512 A1 | 11/2007 | Madanes et al. | |
| 2008/0081662 A1* | 4/2008 | Strandell et al. | 455/557 |
| 2008/0298561 A1* | 12/2008 | Hwang et al. | 379/88.17 |
| 2009/0005122 A1* | 1/2009 | Goldfarb | 455/564 |
| 2009/0010401 A1* | 1/2009 | Zazza | 379/88.17 |
| 2009/0141709 A1* | 6/2009 | Cho et al. | 370/352 |
| 2009/0161661 A1* | 6/2009 | Scharf et al. | 370/352 |
| 2009/0164632 A1* | 6/2009 | Kumar et al. | 709/225 |
| 2009/0201918 A1* | 8/2009 | Cho et al. | 370/352 |
| 2010/0005426 A1* | 1/2010 | Van et al. | 715/860 |
| 2010/0287301 A1 | 11/2010 | Kalmstrom et al. | |
| 2012/0128148 A1 | 5/2012 | Madanes | |
| 2013/0064359 A1 | 3/2013 | Kalmstrom | |

OTHER PUBLICATIONS

"Advisory Action", U.S. Appl. No. 11/415,992, (Feb. 24, 2011), 2 pages.

"Examiners Answer to Appeal Brief", U.S. Appl. No. 11/416,378, (May 10, 2012), 13 pages.

"Final Office Action", U.S. Appl. No. 11/415,992, (Dec. 17, 2010), 12 pages.

"Final Office Action", U.S. Appl. No. 11/416,378, (Feb. 19, 2010), 24 pages.

"Non-Final Office Action", U.S. Appl. No. 11/415,992, (Aug. 26, 2010), 9 pages.

"Non-Final Office Action", U.S. Appl. No. 11/415,992, (Apr. 26, 2010), 8 pages.

"Non-Final Office Action", U.S. Appl. No. 11/416,378, (Feb. 2, 2011), 22 pages.

"Non-Final Office Action", U.S. Appl. No. 11/416,378, (Sep. 1, 2009), 22 pages.

"Non-Final Office Action", U.S. Appl. No. 11/416,378, (Nov. 8, 2011), 26 pages.

"Notice of Allowance", U.S. Appl. No. 11/415,992, (Sep. 6, 2011), 5 pages.

"Non-Final Office Action", U.S. Appl. No. 13/414,523, (Oct. 2, 2013), 8 pages.

* cited by examiner

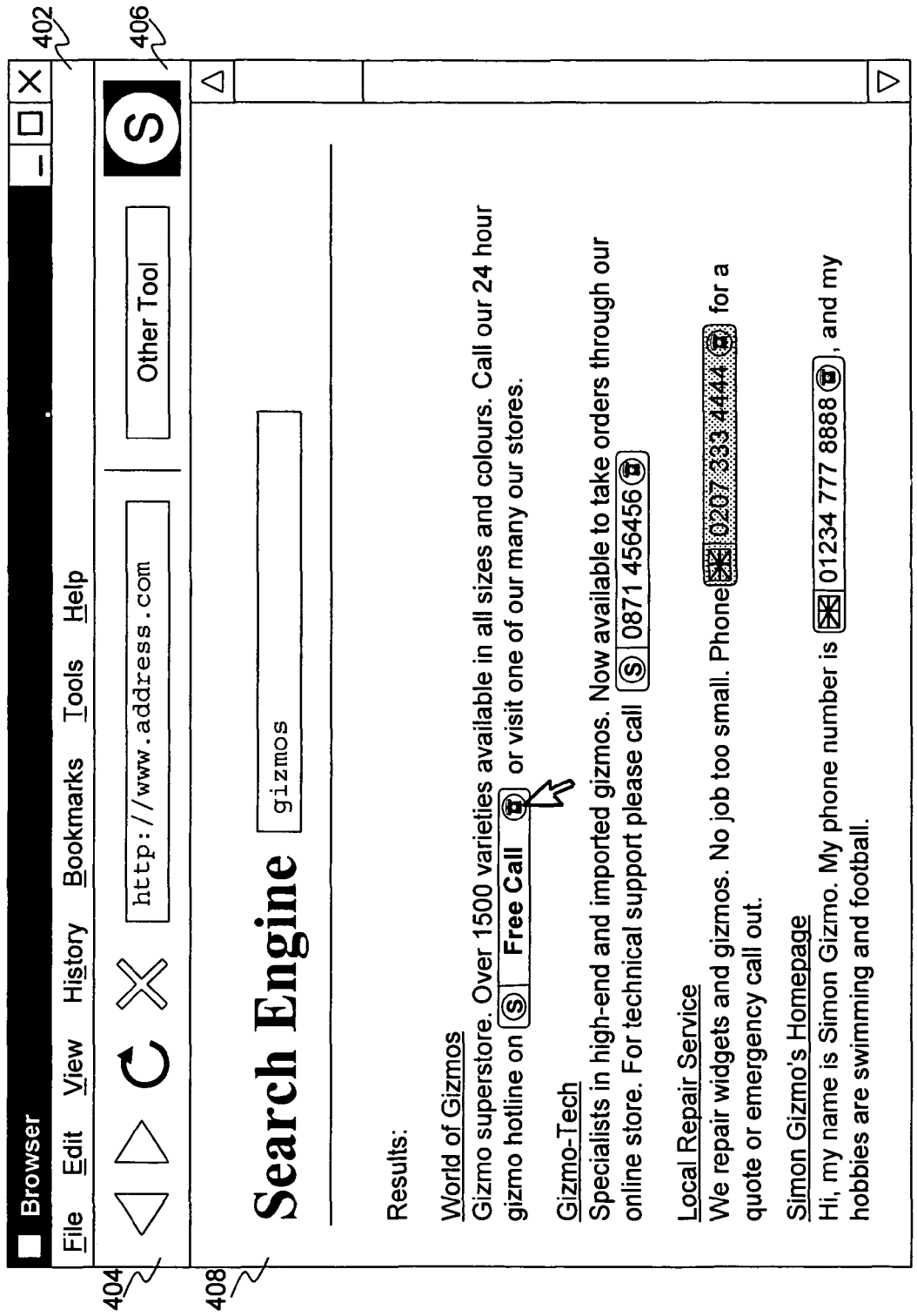

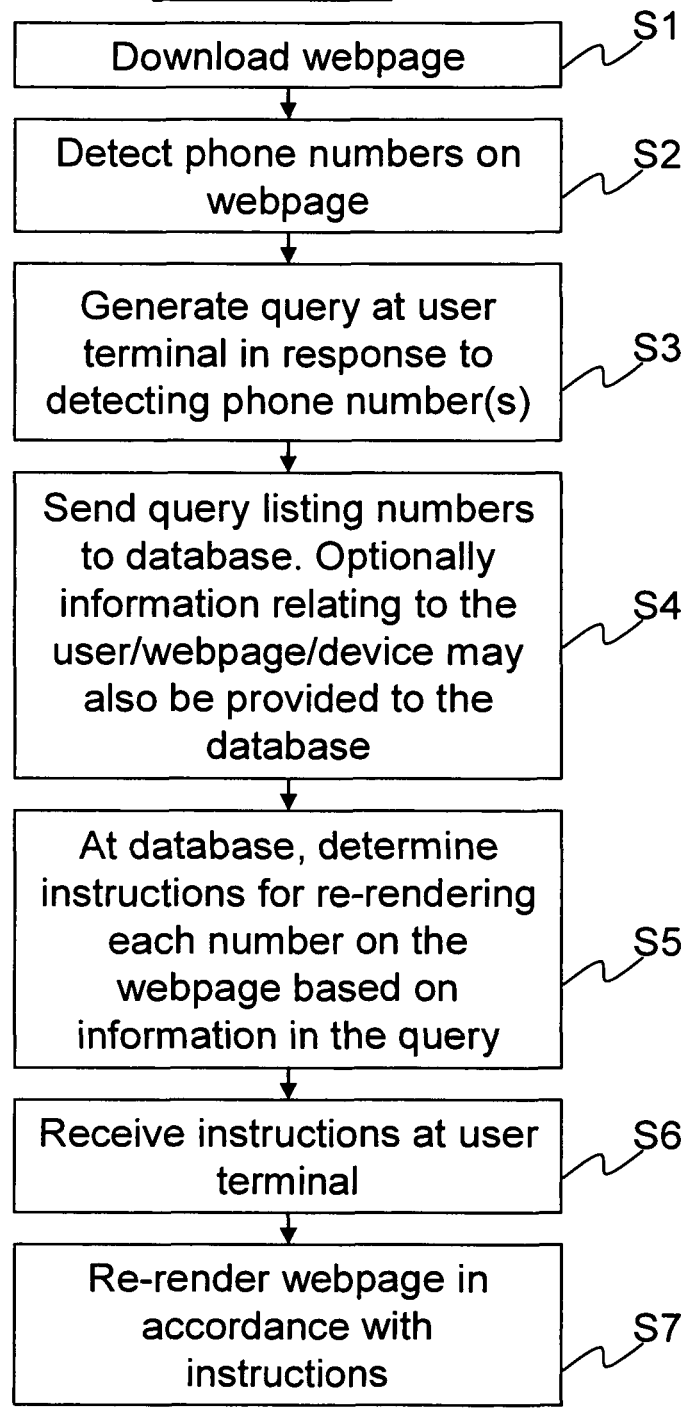

COMMUNICATION SYSTEM AND METHOD

RELATED APPLICATION

This application claims priority under 35 U.S.C. §119 or 365 to Great Britain Application No. 0907922.9, filed May 7, 2009. The entire teachings of the above application are incorporated herein by reference.

FIELD OF THE INVENTION

The present invention relates to communicating over a packet-based network.

BACKGROUND

Some communication systems allow the user of a device, such as a personal computer, to communicate across a packet-based computer network such as the Internet. Such communication systems include voice over internet protocol ("VoIP") communication systems. These systems are beneficial to the user as they are often of significantly lower cost than conventional fixed line or mobile networks. This may particularly be the case for long-distance communication. To use a VoIP system, the user installs and executes client software on their device. The client software provides the VoIP connections as well as other functions such as registration and authentication. In addition to voice communication, the client may also provide further features such as video calling, instant messaging ("IM"), SMS messaging, file transfer and voicemail.

One type of communication system for packet-based communication uses a peer-to-peer ("P2P") topology. To enable access to a peer-to-peer system, a user must execute P2P client software provided by a P2P software provider on their computer, and register with the P2P system. When the user registers with the P2P system, the client software is provided with a digital certificate from a server. Once the client software has been provided with the certificate, then calls or other communications can subsequently be set up and routed between users of the P2P system without the further use of a server in the set-up. Instead, the client looks up the required IP addresses from information distributed amongst the P2P client software on other end users' computers within the P2P system. Once the IP address of a callee's terminal has thus been determined, the caller's P2P client software then exchanges certificates with the callee's P2P client software. The exchange of the digital certificates (or user identity certificates, "UIC") between users provides proof of the users' identities and that they are suitably authorised and authenticated in the P2P system. Therefore, the presentation of digital certificates provides trust in the identity of the users.

It is therefore a characteristic of peer-to-peer communication that, once registered, the users can set up their own communication routes through the P2P system in a decentralized manner based on distributed address look-up and the exchange of one or more digital certificates, without using a server for those purposes. Further details on such a P2P system are disclosed in WO 2005/008524 and WO 2005/009019.

VoIP or other packet-based communications can also be implemented using non-P2P systems that do use centralized call set-up.

SUMMARY

One aim in relation to communication systems such as P2P is to make them more readily accessible or more generally improve their usability. Whilst the communication system may be made very user-friendly, users may still spend more time using other more familiar functionality of their terminal. Thus it would be desirable to integrate features relating to the communication system to some extent with such other functionality. One particular aim in this respect is to aid the user in assessing the relevance of communication-related data that may be output to the user by means not immediately associated with the particular communication system in question.

According to one aspect of the present invention, there is provided a method for use in a communication system, the method comprising: interacting with a document-browser application executed on a first user terminal, the document-browser being configured to retrieve an electronic document from a first storage unit and display it on a screen, wherein said interaction comprises identifying a sequence of numeric or alphanumeric characters in the displayed document as being for use in initiating communication with a second user terminal over the communication system; querying a second storage unit; and based on said query, selecting a display configuration for the identified sequence of characters from a plurality of available display configurations; wherein said interaction further comprises modifying the display of a portion of said document so as to display the identified sequence of characters or information associated therewith in dependence on the determined display configuration.

By interacting with a document-browser to detect a phone number or other such sequence in the document, and modifying how the document is displayed in dependence on a selected one of a plurality of different display configurations for that number or sequence, then the user can advantageously be made aware of the relevance or context of the number or sequence. This enhanced awareness may then influence the user's interaction with the communication system and thus improve usability.

In embodiments, the method may comprise using the identified sequence to initiate communication with the second user terminal via the communication system.

Said initiation of communication with the second user terminal may be performed by execution of a communication client application on the first user terminal.

Said interaction may be performed by execution of a separate toolbar application operating in conjunction with the client application on the first user terminal. Alternatively said interaction may be performed by execution of said communication client application.

Preferably the modified portion displayed in the document also provides a control allowing access to the communications. This means the user can readily access the communications relating to the phone number or other such sequence via the document browser, and furthermore can make their decision about whether to do so based on information provided by the modified display portion for that number or sequence.

Thus in one preferred embodiment, said interaction may further comprise detecting a user input asserted in relation to the modified display portion, and said initiation of communication with the second user terminal may be dependent on said user input; such that the modified display portion may act as a control providing access to communications via the communication client application but presented to a user of the first user terminal via the document-browser application.

In further embodiments said identification of the sequence may comprise identifying a phone number in the displayed document.

The communication system may comprise a packet-based network and a telephone network coupled to the packet-based network via a gateway, the second user terminal may comprise a telephone of the telephone network, and the first user terminal may comprise a user terminal of the packet-based network; and said use of the sequence to initiate communication may comprise using the phone number to establish a bidirectional communication channel from the first terminal to the second terminal via the gateway.

The communication system may comprise a packet-based network and at least one of a fixed-line circuit-switched telephone network and a mobile cellular telephone network coupled to the packet-switched network via a gateway, and said sequence may comprise a telephone number for one of the fixed-line circuit-switched telephone network and the mobile telephone network, in which case the second user terminal may be a corresponding one of a fixed-line telephone and mobile telephone respectively and the bidirectional communication channel may be established via the packet-based network, gateway and the one of the fixed-line circuit-switched telephone network and mobile cellular telephone network.

The display configuration may be selected based on information associated with the identified sequence.

Said identification may comprise recognising a format of the sequence from a plurality of possible formats for use in initiating communication with a second user terminal over the communication system.

The display configuration may be selected in dependence on the recognised format.

The display configuration may be selected in dependence on a characteristic of at least one of: a user of the first terminal, the document, and the first user terminal.

The selected display configuration may comprise pricing information relating to a cost of communicating using the identified sequence.

The communication system may comprise a packet-based network and said second storage unit may comprise a server of the packet-based network; and said selection may comprise: formulating a query at the first user terminal comprising information on the identified sequence, transmitting the query to that server via the packet-based network, and receiving a response to the query comprising an indication of the selected the display configuration.

Said interaction may comprises identifying a plurality of sequences of numeric or alphanumeric characters in the displayed document as each being for use in initiating communication with a respective second user terminal over the communication system; said selection may comprise selecting a respective display configuration for each of the identified sequences of characters from a plurality of available display configurations; and said modification may comprises modifying the display of a portion of said document so as to display the identified sequences or associated information in dependence on the determined display configurations.

Said query may list a plurality of the identified sequences, and said response may comprise an indication of the selected display configuration for each of the queried sequence.

Said query may be further formulated to comprise information on the characteristic of the at least one of the user, document and first user terminal.

The communication system may comprise a packet-based network, the document-browser application may comprise a document-browser client application, and said first storage unit may comprises a server of the packet-based network, such that said execution of the document-browser application may comprise executing the document-browser client application to retrieve the electronic document from that server via the packet-based network and display it on the screen.

According to another aspect of the present invention, there is provided a computer program product comprising code embodied on a computer readable medium, the code being configured so as when executed on a first terminal of a communication system to perform the steps of: interacting with a document-browser application executed on the first user terminal, the document-browser being configured to retrieve an electronic document from a first storage unit and display it on a screen, wherein said interaction comprises identifying a sequence of numeric or alphanumeric characters in the displayed document as being for use in initiating communication with a second user terminal over the communication system; querying a second storage unit; and based on said query, selecting a display configuration for the identified sequence of characters from a plurality of available display configurations; wherein said interaction further comprises modifying the display of a portion of said document so as to display the identified sequence of characters or information associated therewith in dependence on the determined display configuration.

The code of the computer program may be further configured so as when executed to perform any of the above method steps.

According to another aspect of the present invention, there is provided a communication system comprising a first user terminal and a second user terminal, wherein the first user terminal is configured to: execute a document-browser being configured to retrieve an electronic document from a first storage unit and display it on a screen; identify a sequence of numeric or alphanumeric characters in the displayed document as being for use in initiating communication with a second user terminal over the communication system; query a second data store; select a display configuration for the identified sequence of characters from a plurality of available display configurations based on said query; and modify the display of a portion of said document so as to display the identified sequence of characters or information associated therewith in dependence on the determined display configuration.

The first user terminal may be further configured in accordance with any of the above features.

According to another aspect of the present invention, there is provided a method of establishing a communication channel via a gateway between a packet-based network and a telephone network, the method comprising: on a first user terminal, executing a document-browser application to retrieve an electronic document from a first storage unit and display it on a screen; on the first user terminal, executing communication software for use in communicating via the packet-based network; wherein the execution of the communication software comprises interacting with the document-browser application so as to identify a telephone number in the displayed document, querying a second storage unit, and selecting a display configuration for the identified telephone number from a plurality of available display configurations based on said query, wherein said interaction further comprises altering the display of a portion of said document so as to display the identified telephone number or information associated therewith in dependence on the selected display configuration; wherein the execution of the communication software on the first user terminal further comprises using the identified telephone number to establish a bidirectional communication channel with the second user terminal via the packet-based network, gateway and telephone network; and wherein said interaction further comprises detecting a user input asserted in relation to the modified display portion, and said establishment of the communication channel with the second user terminal is dependent on said user input; such that the modified display portion acts as a control providing access to communications via the communication software but presented to a user of the first user terminal via the document-browser application.

According to another aspect of the present invention, there is provided a communication system comprising: a packet-based network including a first user terminal, the first terminal comprising a processor and a memory operatively coupled to the processor; a telephone network including a second user terminal, the second user terminal comprising a telephone; and a gateway coupling the packet-based network to the telephone network; wherein the first terminal is installed with a document-browser application configured so as when executed to retrieve an electronic document from a first storage unit and display it on a screen; wherein the first terminal is further installed with communication software for use in communicating via the packet-based network, the communication software being configured so as when executed to perform steps of interacting with the document-browser application to identify a telephone number in the displayed document, querying a second storage unit, and selecting a display configuration for the identified telephone number from a plurality of available display configurations based on said query, wherein said interaction further comprises altering the display of a portion of said document so as to display the identified telephone number or information associated therewith in dependence on the determined display configuration; wherein the communication software is further configured so as when executed on the first terminal to use the identified telephone number to establish a bidirectional communication channel with the second user terminal via the packet-based network, gateway and telephone network; and wherein the first user terminal is arranged to detect a user input asserted in relation to the modified display portion, and said initiation of establishment of the communication channel with the second user terminal is dependent on said user input; such that the modified display portion acts as a control providing access to communications via the communication software but presented to the a user of the first user terminal via the document-browser application.

BRIEF DESCRIPTION OF THE DRAWINGS

For a better understanding of the present invention and to show how it may be carried into effect, reference will now be made by way of example to the accompanying drawings in which:

FIG. 4*c* is another schematic representation of a web client application user interface with functionality incorporated from the toolbar application; and FIG. 5 is a flow chart of a communication method.

DETAILED DESCRIPTION OF PREFERRED EMBODIMENTS

In preferred embodiments, the present invention retrieves instructions for displaying one or more telephone numbers on a webpage in response to detecting the telephone number(s) on the webpage, or other document displayed on a screen.

Recognition of phone numbers in documents is described in US2007/0274510. According to this, a web page or other document is re-rendered such that numbers or alphanumeric sequences with a particular format are displayed as click to call icons which allow the user to initiate a VoIP call by clicking the icon.

In addition to such phone number recognition, according to preferred embodiments of the present invention then information associated with the detected number (and optionally information relating to the webpage or user) is retrieved and used to re-render the page. The information may be retrieved by formulating a query containing the detected phone number at the user equipment, then sending the query to a server which processes the query and responds with instructions for re-rendering a portion of the page. The instructions may indicate how the number should be displayed, or specify that a clickable call icon or such like should be inserted in association with the number.

In this manner certain numbers can be handled differently, in accordance with different criteria.

For example, numbers that are more relevant to a user, or paid for by a third party, may be displayed more prominently on the web page such that a call may be established more easily.

Pricing information may be retrieved and displayed next to the number such that a user is aware of the cost of the call before the call is established.

Thus P2P or other VoIP or packet-based communications are advantageously made more readily accessible to the user, by integration of related information and/or controls into a more familiar or regularly-used working environment for the user.

As mentioned, the modified page may provide a control such as a clickable call icon which allows the user to establish communications with the relevant party.

However, alternatively or additionally, there are a range of other possible uses for a phone number once it has been recognized and sent to a server for processing. One example is to perform a location lookup and offer location-specific services in conjunction with the city code that the number belongs to. Another is to perform a reverse directory lookup to find additional information about the number, such as the name associated with the phone number, etc., and then provide directory services in conjunction with that company or person's name.

Figure 1:
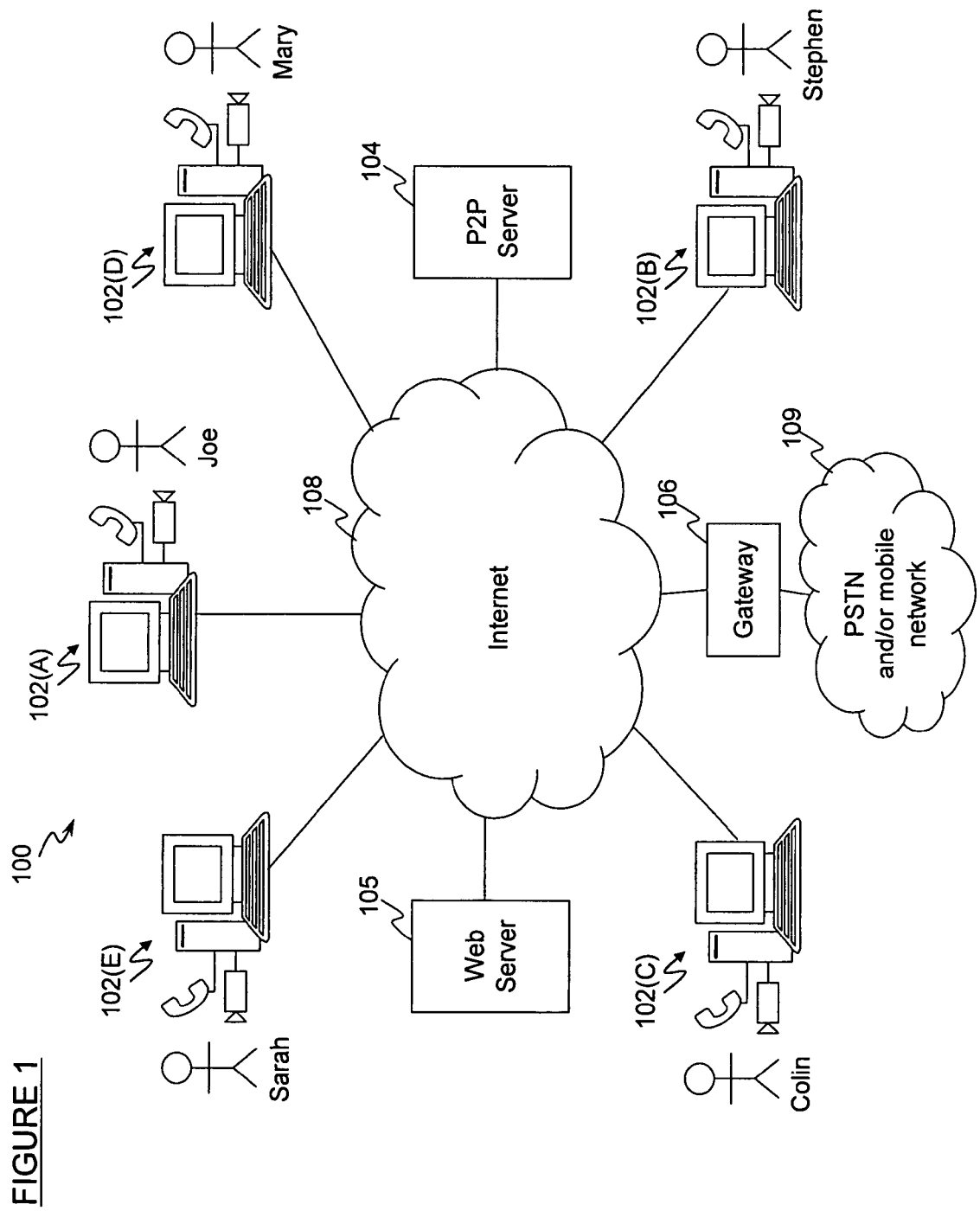
FIG. 1 is a schematic representation of a network such as the Internet.

FIG. 1 is a schematic illustration of a communication system 100. The communication system 100 includes at least a packet-based network such as the Internet, which comprises a plurality of interconnected elements such as those labelled 102, 104, 105 and 106. Each network element is inter-coupled with the rest of the Internet 108, and is configured to communicate data with other such elements over the Internet by transmitting and receiving data in the form of Internet Protocol (IP) packets. Each element also has an associated IP address locating it within the Internet. The elements shown explicitly in FIG. 1 are: a plurality of end-user terminals 102(A) to 102(E) such as desktop or laptop PCs or Internet-enabled mobile phones; one or more P2P servers 104; one or more web servers 105; and a gateway 106 to another type of network 109 such as to a traditional Public-Switched Telephone Network (PSTN) or other circuit switched network, and/or to a mobile cellular network. However, it will of course be appreciated that many more elements make up the Internet than those explicitly shown. This is represented schematically in FIG. 1 by a communications cloud 108 which will include many other end-user terminals, servers and gateways, as well as routers of Internet service providers (ISPs) and Internet backbone routers.

Each of a plurality of the end-user terminals 102 is installed with communication software, in embodiments comprising a P2P client application and a related P2P toolbar application (to be described later). When executed, this allows the end-user terminals 102 to establish bidirectional communication channels with other such end-user terminals 102 via the Internet using P2P call set-up (or more generally connection set-up). The P2P client applications also share presence information with one another, which provides an availability status of users. The presence information for each user is preferably at least in part defined by the user themselves. To supplement the decentralized call set-up, the P2P client application may retrieve some additional information from the P2P server 104, such as contact lists which provide the names of the users' contacts, "avatars" which are images chosen by users to represent themselves within the P2P system.

Each of the end-user terminals 102 is also installed with document-browser client software, in embodiments in the form of a web browser. When executed, this allows the end-user terminals 102 to retrieve electronic documents in the form or webpages from the web server(s) 105 and display them on their screens under control of the user.

A P2P client application may also be installed at one or more gateways 106 coupled to both the Internet 108 and one or more other networks 109 such as a PSTN network and/or a mobile cellular network. This allows the P2P client applications running on end-user terminals 102 to communicate with ordinary land-line telephones and/or mobile telephones respectively, even if those telephones themselves do not run P2P client applications and are not directly coupled to the Internet. In that case, the P2P client application on the terminal 102 sets up a connection over the Internet with the P2P client application on the gateway 106 using P2P call set-up and provides it with a phone number, and the gateway 106 uses the phone number to set up a connection with the telephone over the respective other network. Or in the other direction, a telephone user may dial into the gateway 106 with a number that identifies the user within the P2P system, and the gateway 106 will set up a connection with that user's terminal 102 over the Internet. In either case, a bidirectional communication channel can thus be established via the Internet and PSTN or mobile cellular network.

Figure 2:
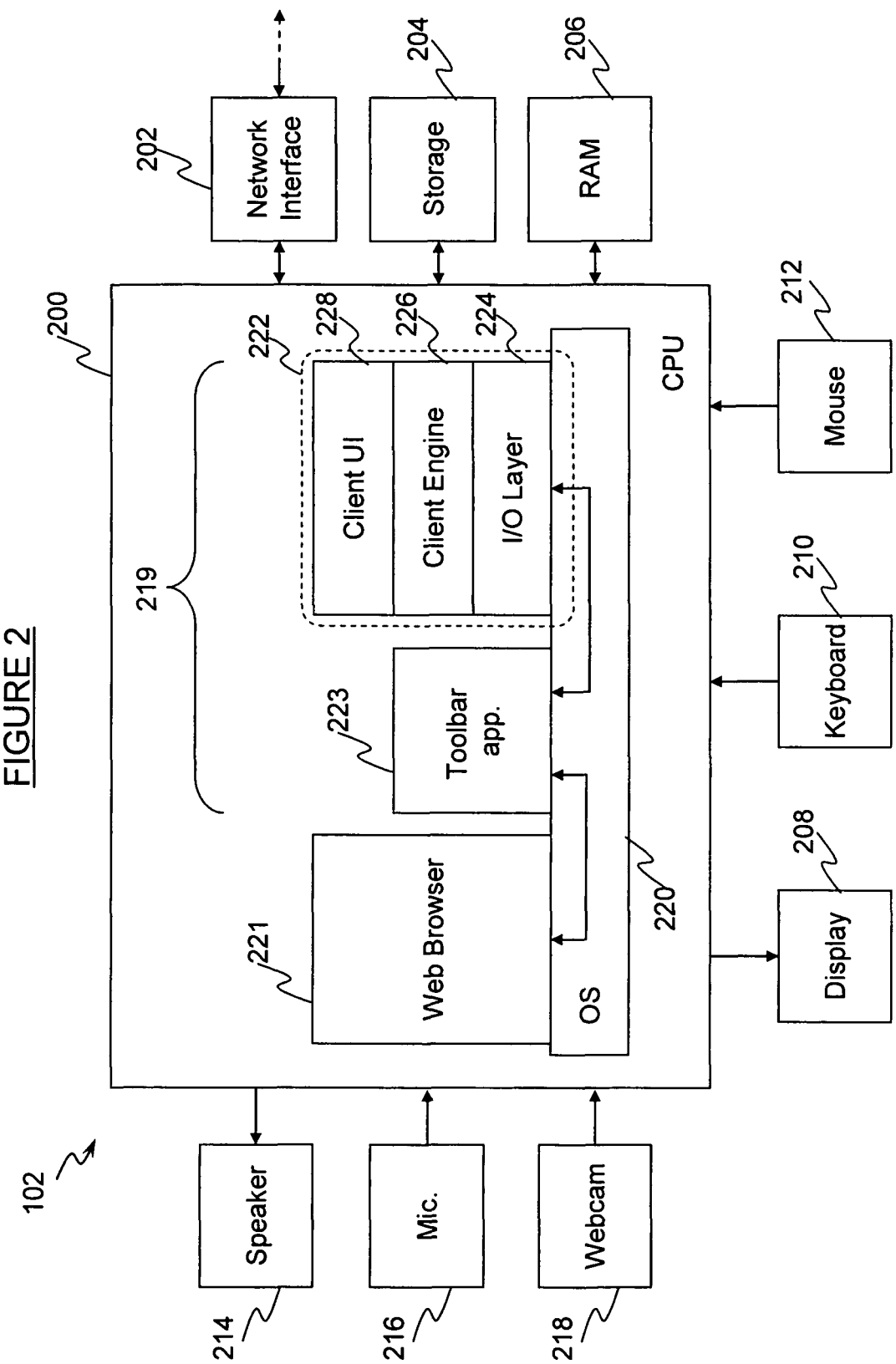
FIG. 2 is a schematic block diagram of a user terminal installed with a web-client application, P2P client application and related toolbar application.

The schematic block diagram of FIG. 2 shows an example of an end-user terminal 102, which is configured to act as a terminal of a P2P system operating over the Internet. The terminal 102 comprises a CPU 200 operatively coupled to: a network interface 202 such as modem for connecting to the Internet 100, a non-volatile storage device 204 such as a hard-drive or flash memory, and a volatile memory device such as a random access memory (RAM) 206. The terminal 102 also comprises one or more user input devices, for example in the form of a keyboard 210, mouse 208, microphone 216 and webcam 218, each operatively coupled to the CPU 200. The terminal 102 further comprises one or more user output devices, for example in the form of a display screen 208 and speaker 214, again each operatively coupled to the CPU 200.

The storage device 204 stores software including at least an operating system (OS) 220, a document-browser client application in the form of a web browser 221, and packet-based communication software 219 comprising a P2P client application 222 and a related P2P toolbar application 223. On start-up or reset of the terminal 102, the operating system software 220 is automatically loaded into the RAM 206 and from there is run by being executed on the CPU 200. Once running, the operating system 220 can then run applications such as the web client application 221, P2P client application 222 and toolbar application 223 by loading them into the into the RAM 206 and executing them on the CPU 200. To represent this schematically in FIG. 2, the operating system 220, web client application 221, P2P client application 222 and toolbar application 223 are shown within the CPU 200.

The P2P client application 222 comprises three basic layers: an input and output (I/O) layer 224, a client engine layer 226, and a user interface (UI) layer 228. The web client application 221, P2P client application 222 and P2P toolbar application 223 are run "on" the operating system 220. This means that in a multi-tasking environment they are scheduled for execution by the operating system 220; and further that inputs to the web client application 221 and the lowest (I/O) layer 224 of the P2P client application 222 from the input devices 202, 216 and 218 as well as outputs from web client application 221 and the I/O layer 224 of the P2P client application 222 to the output devices 202, 208 and 214 may be mediated via suitable drivers and/or APIs of the operating system 220.

The I/O layer 224 of the P2P client application comprises audio and/or video codecs which receive incoming encoded streams and decodes them for output to speaker 214 and/or display 208 as appropriate, and which receive unencoded audio and/or video data from the microphone 216 and/or webcam 218 and encodes them for transmission as streams to other end-user terminals 102 of the P2P system. The I/O layer 224 may also comprises a control signalling protocol for signalling control information between terminals 102 of the network.

The client engine 226 then handles the connection management functions of the P2P system as discussed above, such as establishing calls or other connections by P2P address look-up and authentication. The client engine may also be responsible for other secondary functions of the P2P system such as supplying up-to-date contact lists and/or avatar images of the user to the P2P server 104; or retrieving up-to-date contact lists of the user and retrieving up-to-date avatar images of other users from the P2P server 104. Further, the client engine retrieves presence information from the other clients of the users in the contact list via a public API, and reciprocally provide its own presence information to those other clients that are online. Exchange of presence information directly between clients via a public API is the preferred option, but alternatively the presence information could be exchanged via an intermediate node such as a server 104.

The UI layer 228 is responsible for presenting decoded video to the user via the display 208, for how to arrange the presented output on the display 208 along with user controls such as buttons and menus, and for receiving inputs from the user via the presented controls.

The I/O layer 224 of the P2P client application 222 is arranged to be able to interact with the P2P toolbar application 223 and the toolbar application 223 is arranged to be able to interact with the web client application 221, preferably all under control of the OS 220. This interaction will be discussed in more detail below in relation to FIGS. 4a-5.

Figure 3:
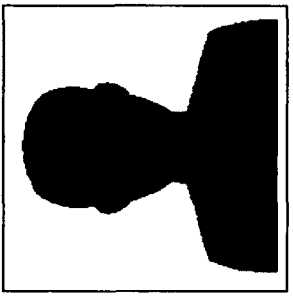
FIG. 3 is a schematic representation of a P2P client application user interface.

FIG. 3 illustrates schematically an example user interface 228 as would be presented to a user on the display 208 when the P2P client application 222 is open for viewing by the user. In this example, the user interface 228 is that of the P2P client application 222 running on a first terminal 102(A). The user interface is divided into a number of panels. A first panel 302 displays some details of the user's own profile, in this example the user's name "Joe Everyman", an avatar image, and a "mood message". These details may be stored at and retrieved from the P2P server 104 by the client engine 226, so as to be made available to other users of the P2P network. The avatar image is an image chosen by the user to represent themselves to other users (which need not necessarily be a photo of themselves). The mood message is a brief user-defined statement which can be used for any purpose but is typically used to express how the user is feeling, news about recent events in the user's life, or any upcoming plans that may affect the user's availability (the mood message may therefore in some cases be considered a type of presence information). When other users view Joe's profile in their own clients, these details will be visible to them via the P2P server 104, and vice versa the other users' details will be made available to Joe's client (if they are in each others' contact lists).

A second panel 304 of the user interface 228 displays a contact list of the user's friends or associates, these being other users of the P2P network. Entry in the contact list is preferably conditional on agreement from the users. The contact list may be stored at and retrieved from the P2P server by the client engine 226, so that the same list is available to the user if running a P2P client application 222 on different terminals. Presence information is also displayed in the panel next to each contact. The presence information represents an availability status which preferably comprises an indication of whether the user is online, and preferably is in part user-defined. For example, the presence status may be: the user is offline (x), the user is online and has selected to be shown as available (√), or the user is online but has selected to be shown as not available (−).

A third panel 306 of the user interface 228 displays the profile of a selected user from the contact list, in this case "Stephen Madeup", a user of a second end-user terminal 102(B). The displayed profile includes Stephen's name, avatar image and mood message, along with other details Stephen may have supplied to the P2P server 104 such as current location, local time, gender and date of birth (DOB). These profile details are retrieved from the P2P server 104 by the client engine 226.

A fourth panel 308 of the user interface 228 then displays communication controls in relation to the selected contact, such as buttons allowing a voice or video call to be established, and a window for entering chat messages. Any incoming chat messages and chat history will be displayed in this panel also, and file transfers may be established by dragging-and-dropping files into the chat window.

Figure 4A:
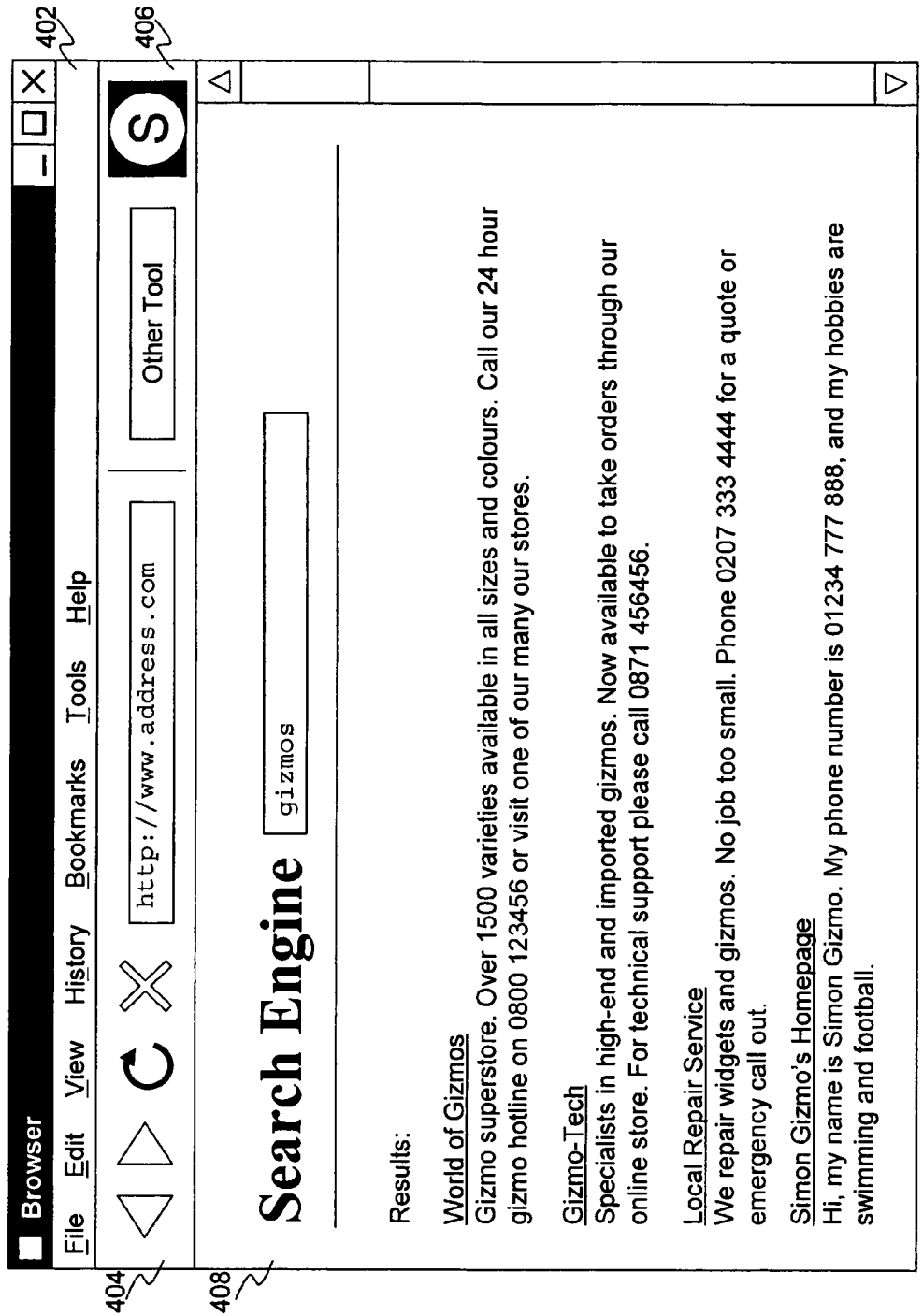
FIG. 4*a* is a schematic representation of a web client application user interface.

FIG. 4*a* illustrates schematically an example user interface of the web client application 221 as would be seen when open for viewing on display 208. This user interface comprises menus for accessing 402 various functions of the browser. The user interface also comprises navigation controls 404 allowing the user to access and navigate between different webpages, such as back, forward, refresh and stop controls and/or an address bar for entering web addresses. Thus the user is able to select which website to retrieve and display from one or more web servers 105. The user interface also comprises a display of the actual selected webpage itself 408. The website comprises various numerical or alphanumerical characters, either in a text format or potentially in graphical form.

The user interface further comprises one or more toolbars 406 showing an indication of one or more toolbar applications running in conjunction with the web client 221. The toolbars may also include controls allowing the user to access the toolbar applications or functions of them, which the user can thus select or control via the web client's user interface. In embodiments, the communication software 219 may comprise one such toolbar application 223 which can be run in conjunction with the web client 221, indicated by the "S" in FIG. 4*c* which indicates to the user at least that the P2P toolbar application 223 is running, and may also allow access to the P2P client 222 of functions thereof when clicked. Further, the toolbar application 223 is able to communicate data to and from both of the web client 221 and P2P client application 222, in embodiments via the OS 220. Even when the user interface 228 of the P2P client application 222 is not open for viewing on the display 208, the toolbar application 223 may still be running and interacting with the web client application 221, and may allow the P2P client application 222 to be launched via the user interface of the web client 221.

Figure 4B:
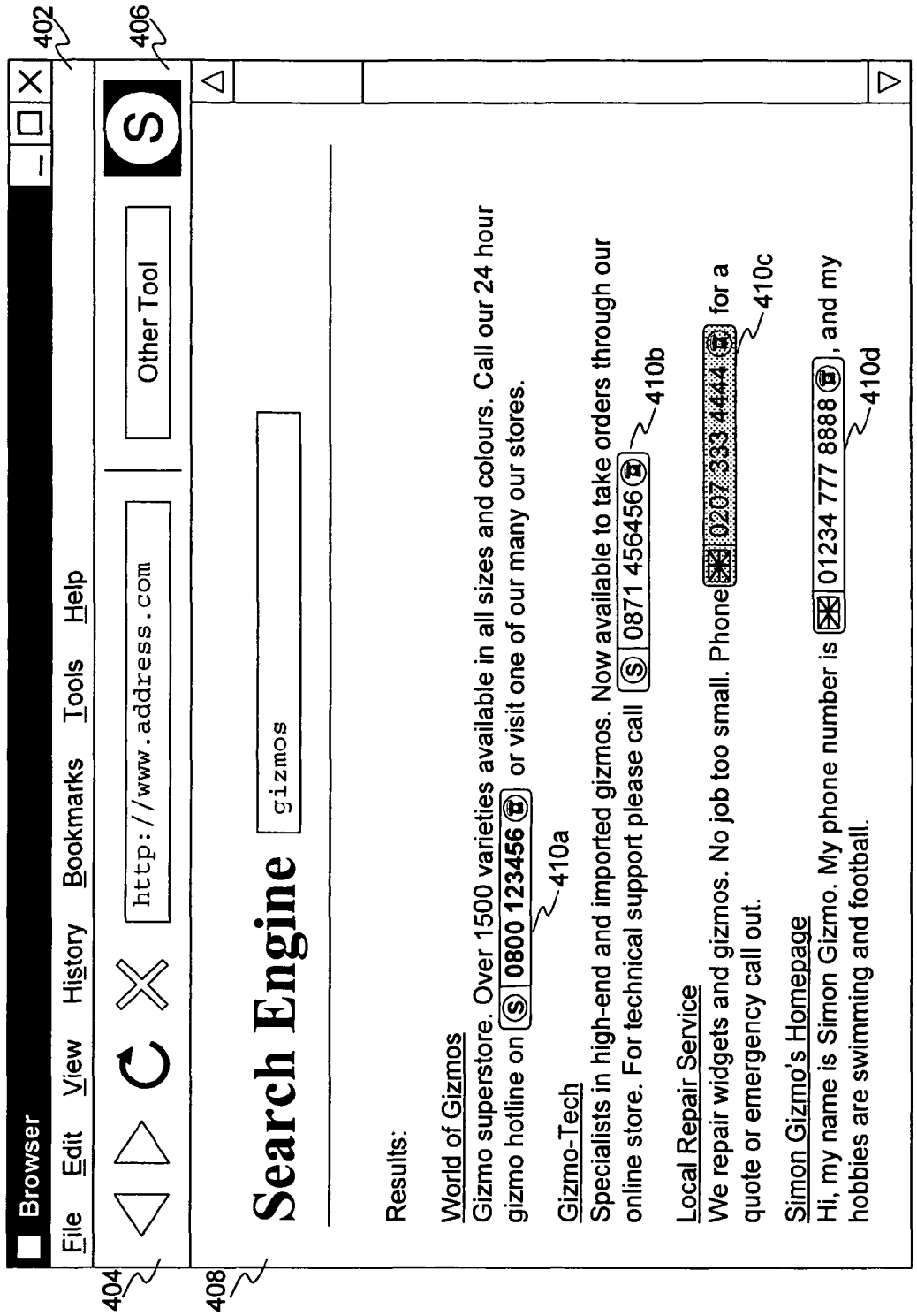
FIG. 4*b* is a schematic representation of a web client application user interface with functionality incorporated from a toolbar application.

A particularly advantageous use of this interaction between toolbar, P2P client and web client is now described in relation to FIG. 4*b*. The P2P toolbar application 223 interacts with the web client 221 in order to read information from the webpage currently selected by the user for viewing. The P2P toolbar application 223 then scans the webpage for numbers having a format that matches one or more of certain predetermined formats. An example for implementing this is described in US2007/0274510. For example, referring to FIG. 4*b*, the toolbar application 223 may recognise that a number beginning "0800" or "0871" and continuing with six further digits is a phone number, and that a number starting "01" or "02" and continuing with nine further digits is a phone number. Such formats could be stored locally at the user terminal 102 or retrieved from a server such as 104.

However, the toolbar 223 application does not mistake numbers like "15000" or "24" as phone numbers.

Once recognised, the toolbar application 223 flags-up the phone numbers by modifying the manner in which a portion 410 of the webpage is displayed so as to change the way the phone numbers are displayed and/or to insert information in conjunction with the webpage. For example in FIG. 4*b* a box is placed around the phone numbers and a control in the form of clickable icon is inserted. If the user clicks the icon, the toolbar application 223 launches the client application 222 and signals the associated phone number to it, and the client application 222 then uses the phone number to establish a call with the relevant telephone via the packet-based network 108, gateway 106 and PSTN or mobile cellular network 109.

According to preferred embodiments of the present invention, not only does the toolbar application 223 highlight or flag-up the phone number, but also selects the manner in which it is flagged-up from a plurality of possibilities depending on some rule or criterion.

Preferably, the rules are implemented at a remote database, e.g. on server like 104 or other server. In that case, in response to detecting one or more phone numbers in the displayed page, the toolbar application 223 run on the user terminal 102 may formulate a query message containing a list of one or more of the recognised numbers, and transmit this query to the database over the packet-based network 108. The database (e.g. on server 104) then evaluates the information in the query based on the rules and formulates a response containing instructions as to which a plurality of potential available display configurations should be used to modify the manner in which the page is displayed for each recognised number. The toolbar application 223 then interacts with the document-browser 221 to re-render the webpage with the modified information.

Alternatively though a set of rules could be retrieved speculatively in advance before detecting phone numbers, or implemented more permanently at the user terminal 102, although the advantage of storing the rules at a centrally queryable database is that they are more readily updated. Further, the modifying of the page does not have to be by rendering and re-rendering, but could alternatively be achieved by modifying the underlying data before actually rendering the document for display on the screen.

The rule(s) preferably at least include a rule by which the selected display configuration depends on the format of the detected phone number. For example, the rule could be that any number whose format corresponds to a free number is displayed in a certain manner, whilst pay numbers are displayed in another. E.g. in FIG. 4b, the toolbar application 223 has determined that numbers beginning "0800" are non-geographic freephone numbers and displays them in bold text surrounded by a certain style of box, whilst numbers beginning "0871" are non-geographic numbers incurring payment and are displayed in a similar style box but without bold text. Further, the toolbar application has determined that numbers beginning "01" or "02" are geographic numbers and surrounds them with a different style of box than non-geographic numbers.

As a further example, referring to FIG. 4c, the manner in which the webpage is displayed could be modified such that when a user performs a certain user interaction in relation to the modified portion of the display, then the display changes in a certain way. For example FIG. 4c, when the user moves the mouse cursor over the inserted call icon for the free-phone "0800" number then the number is overwritten with a message such as "Free Call".

Other examples of instructions for re-rendering webpages could include: an instruction to change the size of number(s) on the webpage; an instruction to display associated information with each number such as company or pricing information, and an instruction to indicate that number is telephone number and provide clickable call icon. In another example, the database could look up the number(s) against a web directory and the rule(s) could be so as to provide instructions for display depending on who the number corresponds to.

Further, the toolbar application 223 may send other information in the query than just the number or detected format. Optionally, information on the user, the webpage and/or the user terminal could be taken into account. For example, the rules could include rules by which the selected display configuration depends on the relevance of the format to the user. For example, if the user lives in London, it could be determined that numbers beginning with "0207" are more relevant than other geographic phone numbers, and hence could be displayed differently. E.g. in FIG. 4b the "0207" number is highlighted in a particular manner whilst the "01234" number is not. In another example, the context of the particular webpage could be taken into account, e.g. numbers on a bank webpage could be ignored in case an account number has the same format as a phone number.

A preferred method of inserting information and related controls into a webpage is now described in relation to FIG. 5.

At step S1, the document-browser application 221 downloads the webpage. At step S2, the toolbar application 223 interacts with the document-browser application 221 to detect any phone numbers on the web page. At this stage the webpage may be rendered to show recognised numbers. At step S3, the toolbar application 223 generates a query at the user terminal 102 in response to detecting the number(s).

At step S4, the toolbar application 102 send query listing the number(s) to a database. Optionally information relating to the user, webpage and/or user terminal 102 itself may also be provided to the database. E.g. user information such as age, sex, etc. retrieved from the toolbar 223 or from the client 222 may be provided. Information relating to the webpage domain may be provided so that the instructions for re-rendering the webpage may be customised to the context of the webpage, for example numbers displayed in a web directory may be displayed as phone numbers, however numbers displayed on a bank webpage may be ignored to avoid highlighting account numbers.

At step S5, at the database, instructions are determined for re-rendering each number on the webpage according to information provided in the query. At step 6 the instructions are received back at the user terminal 102 from the database. At step S7 the toolbar application 223 interacts with the document-browser application to re-render the webpage in accordance with the instructions.

It will be appreciated that the above embodiments are described only by way of example.

For instance, although the above has been described mainly in terms of a peer-to-peer (P2P) network, the present invention is not specific to P2P and may be applied to any kind of packet-based communications. Further, the present invention is not limited to use over the Internet, but could be implemented over any packet-based network.

Although the above has been described in terms of a web browser and webpages, the present invention is not specific to the web and can more generally apply to any documents accessed from a server by means of any document-browser client software, or more generally even any documents or user-interface displayed on the client computer—phone numbers can occur also in documents that were opened from a local storage unit, not necessarily just from a server. For example, the invention could recognise names in word-processing documents.

Note also that the term "document" as used herein does not imply any limitation to the purpose of the document. For example, an html document could comprise an application, such as an online CRM system, networking site or many others.

Further, although the toolbar application and P2P client application have been described above as separate applications, and in preferred embodiments are provided as separately executable applications, in other embodiments they need not be separate and could be incorporated together into the same executable program, and/or even if having any degree of independence they could still be considered together as different parts of the same overall communication client application. Generally speaking, the term "application" as used herein need not necessarily refer to any particular discrete unit of software such as a single or separately executable program. Any functionality described above as a particular application could comprise one or more distinct or independently operable portions of code. Further, although in preferred embodiments the document browser and communication client are separately executable applications, again they need not necessarily be.

Further, note that even if the telephone network in question also uses packets, e.g. if the mobile cellular network is packet-based, then it may still be considered a distinct network from the other packet-based network such as the Internet in that it uses packets of different protocol and will still require a gateway for mediating between the two.

With regard to telephone numbers, note that these can be considered to identify either a particular terminal or a particular user—in that at any given time the phone number maps to a particular terminal, but is also associated with a particular user or perhaps group of users such as in the case of a family land-line.

Further, note that whilst reference may have been made above to a components such as a memory or processor of a user terminal 102, a server of the packet-based network, or gateway between the packet-based network and telephone network, generally these terms need not necessarily refer to single modules—e.g. a memory or storage unit of a user terminal may comprise one or more memory types such as flash memory and hard-drive, etc.; a processor of a user terminal may comprise multiple cores or execution units; a server may comprise a number of server modules distributed across a network; and a gateway may comprise a number of gateway modules distributed across a network.

Other applications and configurations may of the present invention be apparent to the person skilled in the art given the disclosure herein. The scope of the invention is not limited by the described embodiments, but only by the appended claims.

The invention claimed is:

1. A method for use in a communication system, the method comprising:
   interacting with a document-browser application executed on a first user terminal, the document-browser being configured to retrieve an electronic document from a first storage unit and display it on a screen, wherein said interaction comprises identifying a sequence of numeric or alphanumeric characters in the displayed document as being for use in initiating communication with a second user terminal over the communication system;
   querying a second storage unit by formulating a query message containing at least one said sequence of numeric or alphanumeric characters, evaluating the query based on a set of rules and formulating a response containing instructions; and
   based on said instructions, selecting a display configuration for the identified sequence of characters from a plurality of available display configurations;
   wherein said interaction further comprises modifying the display of a portion of said document so as to display the identified sequence of characters or information associated therewith in dependence on the determined display configuration.

2. The method of claim 1, comprising using the identified sequence to initiate communication with the second user terminal via the communication system.

3. The method of claim 2, wherein said initiation of communication with the second user terminal is performed by execution of a communication client application on the first user terminal.

4. The method of claim 3, wherein said interaction is performed by execution of a separate toolbar application operating in conjunction with the client application on the first user terminal.

5. The method of claim 3, wherein said interaction is performed by execution of said communication client application.

6. The method of claim 3, wherein said interaction further comprises detecting a user input asserted in relation to the modified display portion, and said initiation of communication with the second user terminal is dependent on said user input; such that the modified display portion acts as a control providing access to communications via the communication client application but presented to a user of the first user terminal via the document-browser application.

7. The method of claim 1, wherein said identification of the sequence comprises identifying a phone number in the displayed document.

8. The method of claim 2, wherein the communication system comprises a packet-based network and a telephone network coupled to the packet-based network via a gateway, the second user terminal comprises a telephone of the telephone network, and the first user terminal comprises a user terminal of the packet-based network; and
   said use of the sequence to initiate communication comprises using the phone number to establish a bidirectional communication channel from the first terminal to the second terminal via the gateway.

9. The method of claim 8, wherein the communication system comprises a packet-based network and at least one of a fixed-line circuit-switched telephone network and a mobile cellular telephone network coupled to the packet-switched network via a gateway, and said sequence comprises a telephone number for one of the fixed-line circuit-switched telephone network and the mobile telephone network, the second user terminal being a corresponding one of a fixed-line telephone and mobile telephone respectively and the bidirectional communication channel being established via the packet-based network, gateway and the one of the fixed-line circuit-switched telephone network and mobile cellular telephone network.

10. The method of claim 1, wherein the display configuration is selected based on information associated with the identified sequence.

11. The method of claim 1, wherein said identification comprises recognizing a format of the sequence from a plurality of possible formats for use in initiating communication with a second user terminal over the communication system.

12. The method of claim 10, wherein the display configuration is selected in dependence on the recognized format.

13. The method of claim 1, wherein the display configuration is selected in dependence on a characteristic of at least one of: a user of the first terminal, the document, or the first user terminal.

14. The method of claim 1, wherein the selected display configuration comprises pricing information relating to a cost of communicating using the identified sequence.

15. The method of claim 1, wherein the communication system comprises a packet-based network and said second storage unit comprises a server of the packet-based network; and wherein the query is formulated at the first user terminal comprising information on the identified sequence, transmitting the query and it is transmitted to that server via the packet-based network.

16. The method of claim 1, wherein: said interaction comprises identifying a plurality of sequences of numeric or alphanumeric characters in the displayed document as each being for use in initiating communication with a respective second user terminal over the communication system; said selection comprises selecting a respective display configuration for each of the identified sequences of characters from a plurality of available display configurations; and said modification comprises modifying the display of a portion of said document so as to display the identified sequences or associated information in dependence on the determined display configurations.

17. The method of claim 15, wherein said query lists a plurality of the identified sequences, said response comprises an indication of the selected display configuration for each of the queried sequence.

18. The method of claim 13, wherein said query is further formulated to comprise information on the characteristic of the at least one of the user, document and first user terminal.

19. The method of claim 1, wherein the communication system comprises a packet-based network, the document-browser application comprises a document-browser client application, and said first storage unit comprises a server of the packet-based network, such that said execution of the document-browser application comprises executing the document-browser client application to retrieve the electronic document from that server via the packet-based network and display it on the screen.

20. A computer program product comprising code embodied on a computer readable storage memory, the code being configured so as when executed on a first terminal of a communication system to perform operations comprising:
  interacting with a document-browser application executed on the first user terminal, the document-browser being configured to retrieve an electronic document from a first storage unit and display it on a screen, wherein said interaction comprises identifying a sequence of numeric or alphanumeric characters in the displayed document as being for use in initiating communication with a second user terminal over the communication system;
  receiving a message that is in response to a query, the message including at least one said sequence of numeric or alphanumeric characters and instructions related to display configuration; and
  based on said instructions, selecting a display configuration for the identified sequence of characters from a plurality of available display configurations;
wherein said interaction further comprises modifying the display of a portion of said document so as to display the identified sequence of characters or information associated therewith in dependence on the determined display configuration.

21. A communication system comprising a first user terminal and a second user terminal, wherein the first user terminal is configured to:
  execute a document-browser being configured to retrieve an electronic document from a first storage unit and display it on a screen;
  identify a sequence of numeric or alphanumeric characters in the displayed document as being for use in initiating communication with a second user terminal over the communication system;
  receive a message that is in response to a query, the message including a at least one said sequence of numeric or alphanumeric characters and instructions related to display configuration;
  select a display configuration for the identified sequence of characters from a plurality of available display configurations based on said instructions; and
modify the display of a portion of said document so as to display the identified sequence of characters or information associated therewith in dependence on the determined display configuration.

22. The communication system of claim 21, wherein the first user terminal is configured to use the identified sequence to initiate communication with the second user terminal over the communication system.

23. The communication system of claim 22, comprising a packet-based network including the first user terminal, a telephone network including the second user terminal, and a gateway coupling the packet-based network to the telephone network; wherein the second user terminal comprises a telephone, said sequence comprises a telephone number, and the first user terminal is configured to use the identified telephone number to establish a bidirectional communication channel with the second user terminal via the packet based network, gateway and telephone network.

24. The communication system of claim 22, wherein the first user terminal is arranged to detect a user input asserted in relation to the modified display portion, and said initiation of communication with the second user terminal is dependent on said user input; such that the modified display portion acts as a control providing access to communications presented to a user of the first user terminal via the document-browser application.

25. A method of establishing a communication channel via a gateway between a packet-based network and a telephone network, the method comprising:
  on a first user terminal, executing a document-browser application to retrieve an electronic document from a first storage unit and display it on a screen;
  on the first user terminal, executing communication software for use in communicating via the packet-based network;
    wherein the execution of the communication software comprises interacting with the document-browser application so as to identify a telephone number in the displayed document, receiving a message that is in response to a query, the message including at least one said sequence of numeric or alphanumeric characters and instructions related to display configuration, and selecting a display configuration for the identified telephone number from a plurality of available display configurations based on said instructions, wherein said interaction further comprises altering the display of a portion of said document so as to display the identified telephone number or information associated therewith in dependence on the selected display configuration;
  wherein the execution of the communication software on the first user terminal further comprises using the identified telephone number to establish a bidirectional communication channel with the second user terminal via the packet-based network, gateway and telephone network; and
    wherein said interaction further comprises detecting a user input asserted in relation to the modified display portion, and said establishment of the communication channel with the second user terminal is dependent on said user input; such that the modified display portion acts as a control providing access to communications via the communication software but presented to a user of the first user terminal via the document-browser application.

26. A communication system comprising:
  a packet-based network including a first user terminal, the first terminal comprising a processor and a memory operatively coupled to the processor;
  a telephone network including a second user terminal, the second user terminal comprising a telephone; and
    a gateway coupling the packet-based network to the telephone network;
  wherein the first terminal is installed with a document-browser application configured so as when executed to retrieve an electronic document from a first storage unit and display it on a screen;
    wherein the first terminal is further installed with communication software for use in communicating via the packet-based network, the communication software being configured so as when executed to perform steps of interacting with the document-browser application to identify a telephone number in the displayed document, receiving a message that is in response to a query, the message including at least one said sequence of numeric or alphanumeric characters and instructions related to display configuration, and selecting a display configuration for the identified telephone number from a plurality of available display configurations based on said instructions, wherein said interaction further comprises altering the display of a portion of said document so as to display the identified telephone number or information associated therewith in dependence on the determined display configuration;

wherein the communication software is further configured so as when executed on the first terminal to use the identified telephone number to establish a bidirectional communication channel with the second user terminal via the packet-based network, gateway and telephone network; and wherein the first user terminal is arranged to detect a user input asserted in relation to the modified display portion, and said initiation of establishment of the communication channel with the second user terminal is dependent on said user input; such that the modified display portion acts as a control providing access to communications via the communication software but presented to the a user of the first user terminal via the document-browser application.

27. A method for use in a communication system, the method comprising:

interacting with a document-browser application executed on a first user terminal, the document-browser being configured to retrieve an electronic document from a first storage unit and display it on a screen, wherein said interaction comprises identifying a sequence of numeric or alphanumeric characters in the displayed document as being for use in initiating communication with a second user terminal over a packet-based network;

querying a server of the packet-based network by formulating, at the first user terminal, a query message containing at least one said sequence of numeric or alphanumeric characters, transmitting the query via the packet-based network, evaluating the query based on a set of rules and formulating a response containing instructions; and based on said instructions, selecting a display configuration for the identified sequence of characters from a plurality of available display configurations;

wherein said interaction further comprises modifying the display of a portion of said document so as to display the identified sequence of characters or information associated therewith in dependence on the determined display configuration.

* * * * *